(12) United States Patent
Hamann et al.

(10) Patent No.: US 12,213,418 B2
(45) Date of Patent: Feb. 4, 2025

(54) APPARATUS FOR RECEIVING AND DEPOSITING PLANT POTS WHICH STAND IN ROWS

(71) Applicant: SEED2SOIL GMBH & CO. KG, Weifelstede (DE)

(72) Inventors: Malte Hamann, Edewecht (DE); Florian Lücking, Godensholt (DE); Michael Pokriefke, Hude (DE); Dennis Pülscher, Edewecht (DE)

(73) Assignee: SEED2SOIL GMBH & CO. KG, Weifelstede (DE)

( * ) Notice: Subject to any disclaimer, the term of this patent is extended or adjusted under 35 U.S.C. 154(b) by 10 days.

(21) Appl. No.: 18/162,289

(22) Filed: Jan. 31, 2023

(65) Prior Publication Data
US 2023/0240202 A1   Aug. 3, 2023

(30) Foreign Application Priority Data
Feb. 1, 2022   (DE) .......................... 102022102330.3

(51) Int. Cl.
*A01G 9/08*   (2006.01)
(52) U.S. Cl.
CPC .................................... *A01G 9/088* (2013.01)
(58) Field of Classification Search
CPC .................................. A01G 9/88; A01G 9/088
See application file for complete search history.

(56) References Cited

U.S. PATENT DOCUMENTS

| | | | | |
|---|---|---|---|---|
| 3,760,966 A * | 9/1973 | Jones, Jr. | .................. | B66F 9/18 414/785 |
| 5,215,427 A * | 6/1993 | Olsthoorn | ................. | B66F 9/12 414/664 |
| 5,688,102 A * | 11/1997 | Vieselmeyer | ........ | A01G 23/043 414/667 |
| 8,016,334 B2 * | 9/2011 | Garrett | .................... | B66F 9/183 294/119.1 |
| 9,604,830 B2 * | 3/2017 | Tygard | .................... | B66F 9/148 |

(Continued)

FOREIGN PATENT DOCUMENTS

| | | |
|---|---|---|
| EP | 0395166 B1 | 10/1990 |
| EP | 2857332 A2 | 4/2015 |

(Continued)

*Primary Examiner* — Monica L Perry
*Assistant Examiner* — Aaron M Rodziwicz
(74) *Attorney, Agent, or Firm* — McKee, Voorhees & Sease, PLC

(57) ABSTRACT

An apparatus (2) for receiving and depositing plant pots (26) which stand in rows, having at least two receiving channels (4) that are arranged in parallel beside each other and which extend in an extent direction (R) and are provided with lateral delimitations (6). Adjustment of the channel width (24) of the receiving channels (4) with an adjustment apparatus (14), includes the lateral delimitations (6) that are supported in a laterally displaceable and rotationally secure manner on a displacement member (16) which is orientated transversely relative to the extent direction (R) of the receiving channels (4), the lateral delimitations (6) are connected to an adjustable coupling rod linkage (18), the coupling rod linkage (18) form the adjustment apparatus (14), and the coupling rod linkage (18) adjusts the channel width (24) of all the receiving channels (4) by the same value.

18 Claims, 5 Drawing Sheets

(56) References Cited

U.S. PATENT DOCUMENTS

| | | | | |
|---|---|---|---|---|
| 2005/0135913 A1* | 6/2005 | Visser | ................. | B66F 9/195 |
| | | | | 414/623 |
| 2010/0140021 A1* | 6/2010 | Gillotti | ................. | B66F 9/12 |
| | | | | 187/237 |

FOREIGN PATENT DOCUMENTS

| | | | | |
|---|---|---|---|---|
| EP | 2593394 B1 * | 11/2019 | ............ | B66F 9/142 |
| NL | 9402104 A | 7/1996 | | |

* cited by examiner

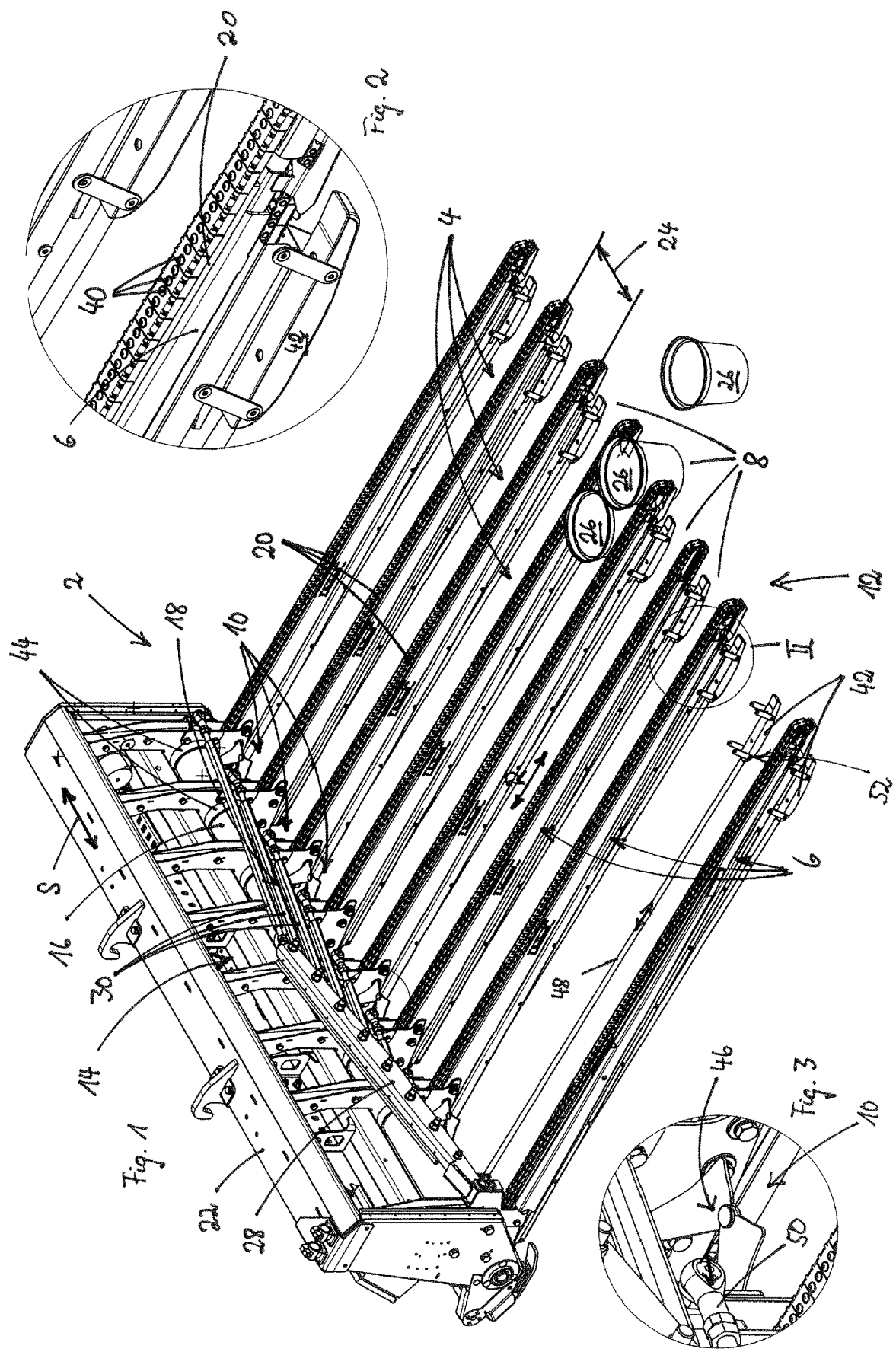

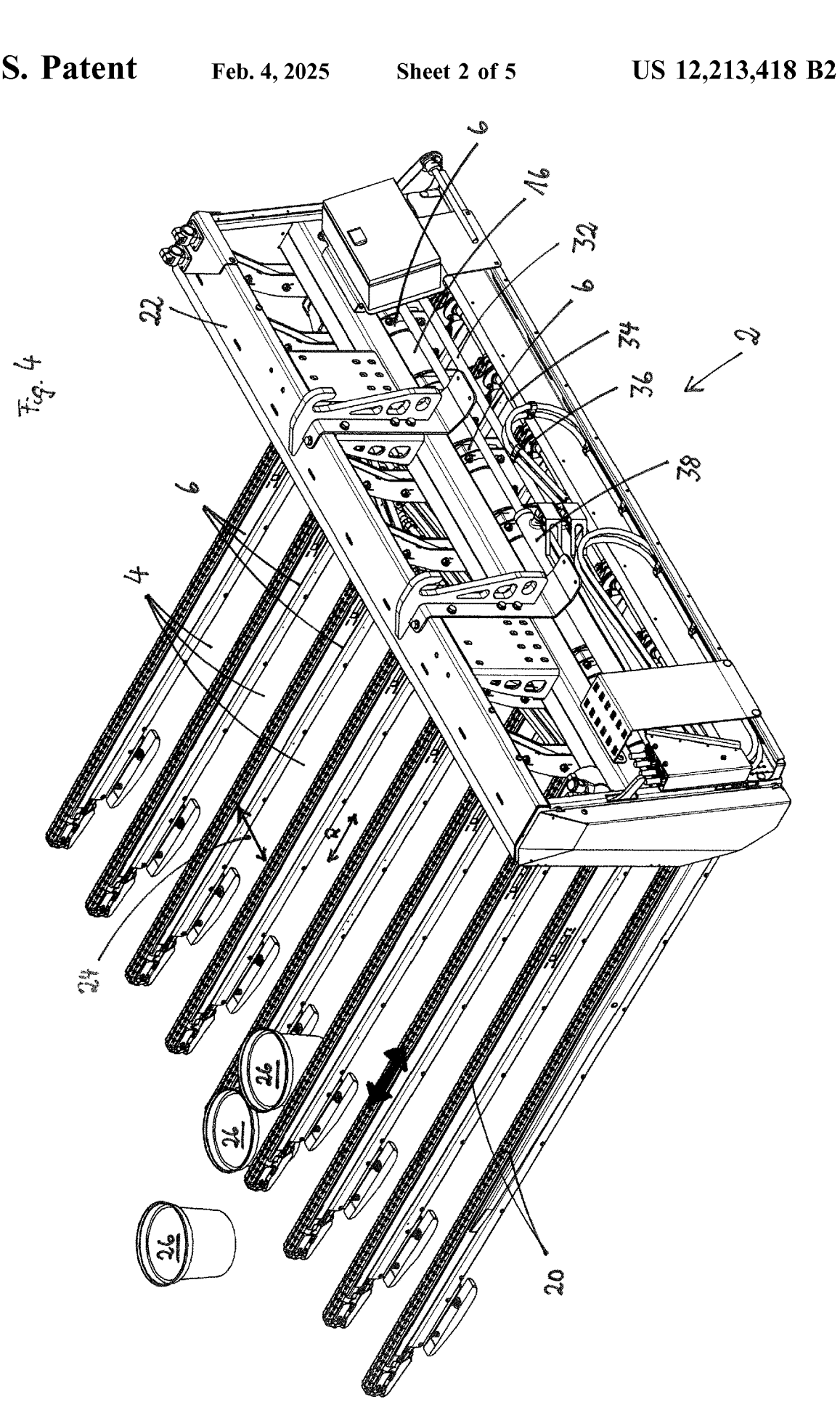

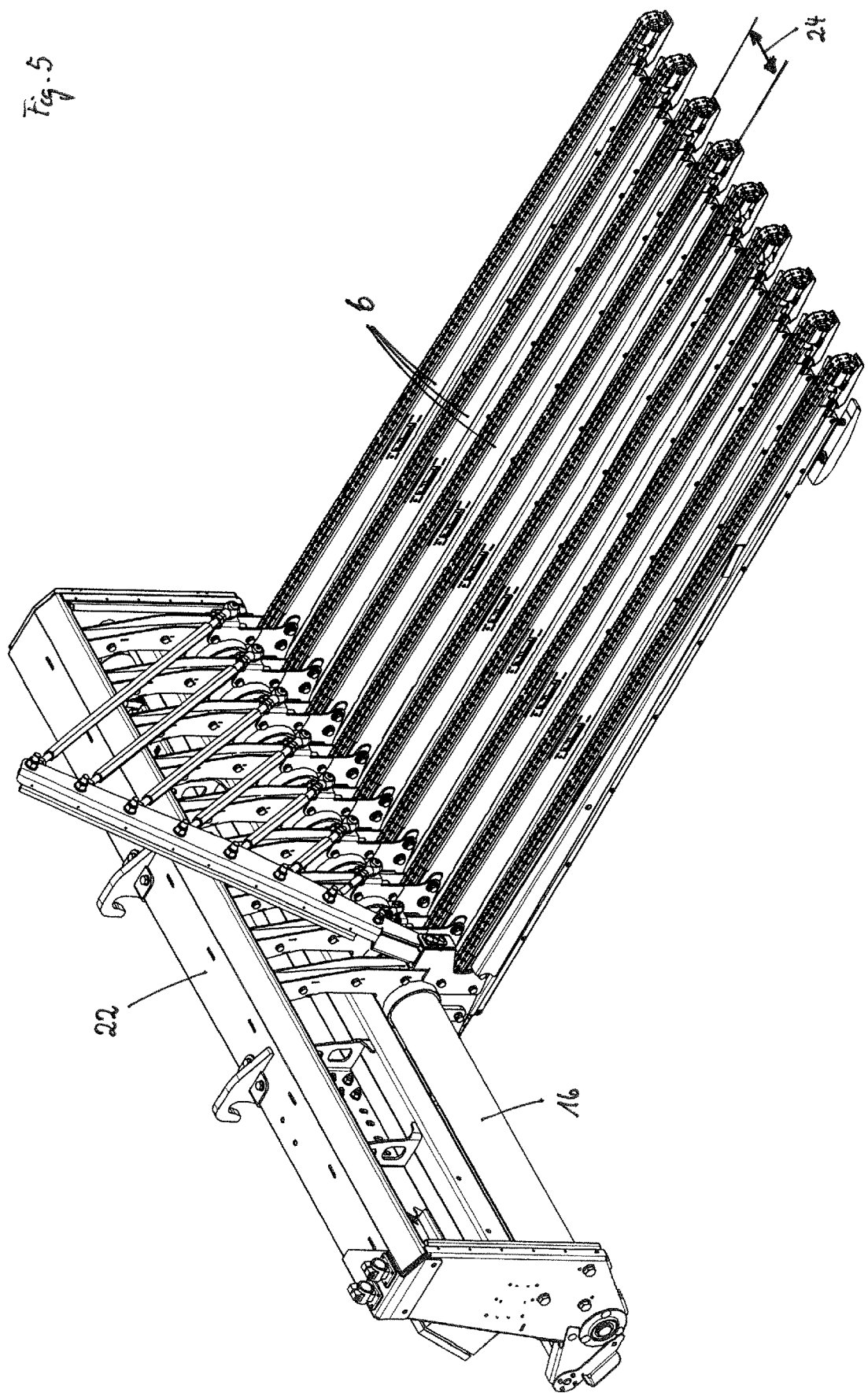

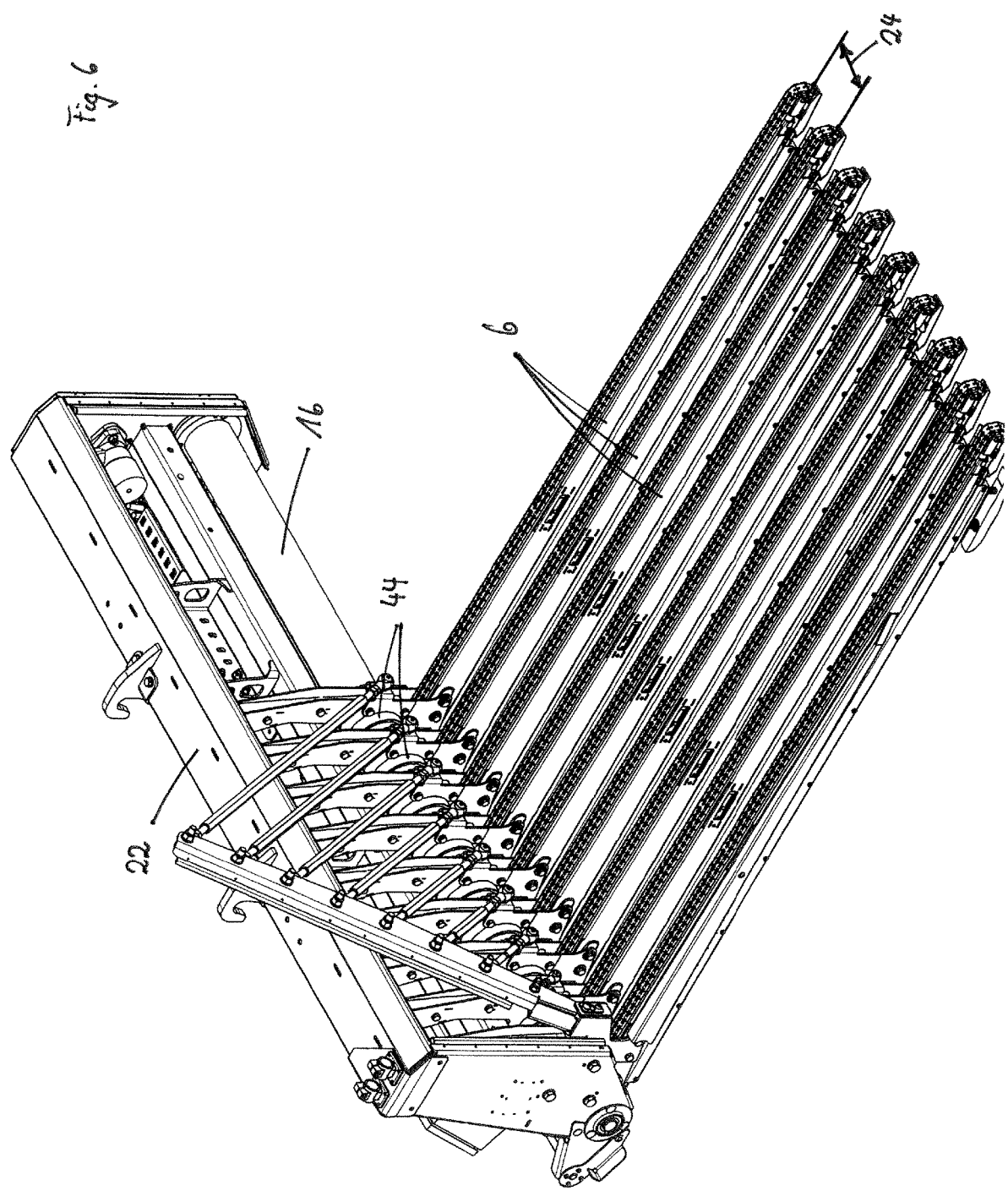

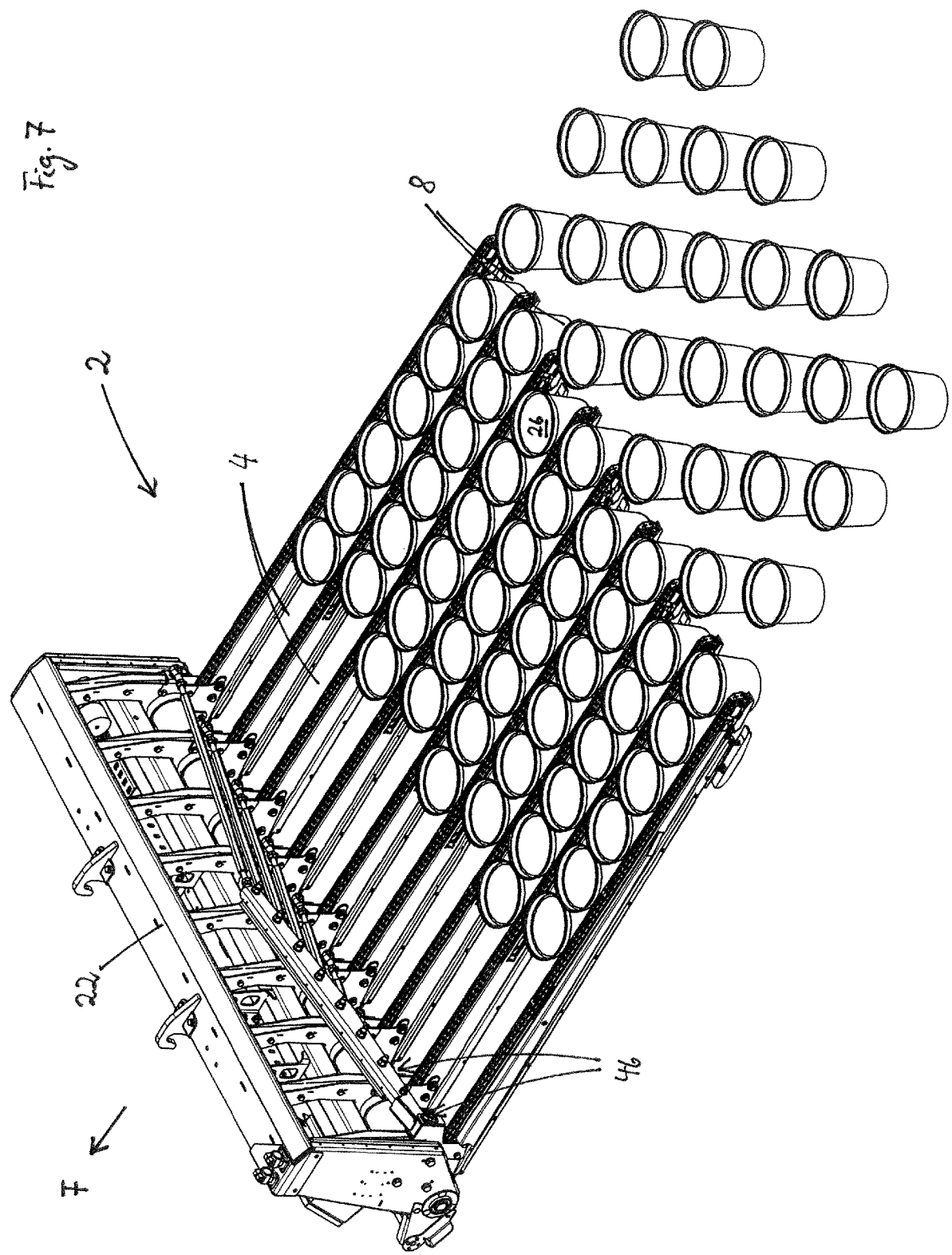

APPARATUS FOR RECEIVING AND DEPOSITING PLANT POTS WHICH STAND IN ROWS

CROSS REFERENCE TO RELATED APPLICATIONS

This application claims priority under 35 U.S.C. § 119 to German Patent Application DE 10 2022 102 330.3, filed Feb. 1, 2022, which is herein incorporated by reference in its entirety, including without limitation, the specification, claims, and abstract, as well as any figures, tables, appendices, or drawings thereof.

FIELD OF THE INVENTION

The present invention relates generally to an apparatus or receiving and depositing plant pots, which stand in rows.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

A generic apparatus is known from the document European Patent Application EP 2 857 332 A1. The adjustment apparatus disclosed in this instance is, however, complex to handle. In order to adjust the apparatus to a new pot width, the channel width of each individual receiving channel has to be adjusted per se to the new desired channel width. This involves a significant amount of work and time. If this is not carried out in a precise enough manner, malfunctions of the apparatus occur.

Other transport apparatuses for potted plants are known from documents European Patent Application EP 0 395 166 B1 and European Patent Application EP 1 455 566 B1. A width adjustment of the receiving channels is, however, not known from these documents.

Thus, there exists a need in the art for an apparatus that provides a width adjustment for channels that comport with new pot widths.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention is that it relates to an apparatus for receiving and depositing plant pots, which stand in rows, having a frame, and more than one receiving channel, which are arranged in parallel beside each other and which extend in an extent direction and which are provided with lateral delimitations, wherein the receiving channels in each case extend from a transfer zone up to a channel end, a conveying apparatus by means of which the plant pots can be moved in the extent direction of the respective receiving channel, and an adjustment apparatus for adjusting the channel width of the receiving channels.

An object of the present invention is to improve the adjustment apparatus of the generic apparatus. In particular, the apparatus should be able to be adapted to different sizes of plant pots in the simplest manner possible.

The object is achieved for a generic apparatus in that the lateral delimitations are supported in a laterally displaceable and rotationally secure manner on a displacement member, which is orientated transversely relative to the extent direction of the receiving channels, and the lateral delimitations are connected to an adjustable coupling rod linkage and are retained thereby in their respective operating position, the coupling rod linkage forms the adjustment apparatus, and the coupling rod linkage is constructed during the activation thereof to adjust the channel width of all the receiving channels by the same value.

As a result of the simultaneous adjustment of the lateral delimitations via the coupling rod linkage, the channel width of the receiving channels can be more easily adapted to different pot sizes. It is simply necessary to adjust the coupling rod linkage once in order to thereby adjust all the receiving channels simultaneously to a new pot size. The adjustment is less time-consuming, and the adjustment is less susceptible to errors since with an adjustment of the coupling rod linkage, the channel widths of all the receiving channels change by the same extent. The coupling rod linkage can be produced in a cost-effective manner, the handling and operation are simple, and there is hardly any maintenance complexity during the service life of the apparatus. The coupling rod linkage can be configured in a steplessly adjustable manner so that it can be adapted with millimeter precision to all possible pot sizes. The apparatus can thereby be operated more effectively with a high degree of operational reliability. The displacement member can be one of the slotted displacement member type.

The receiving channels in the context of this invention may be configured to be open at the bottom so that the plant pots are retained in a state freely suspended in a downward direction between the lateral delimitations when they are located in the receiving channels. The apparatus may, however, also be provided in the region of the receiving channels with a base or other base-side delimitation such as, for example, a sliding bar, on which the plant pots which have been drawn in stand or can at least be supported.

According to one embodiment of the invention, the coupling rod linkage can be adjusted by means of a linear drive. The linear drive adjusts the coupling rod linkage in a linear direction. A hydraulic cylinder may be considered to be an example of a linear drive. A hydraulic cylinder is capable, using the hydraulic fluid with which it is moved, of building up high actuating forces on comparatively short travel paths. It is nonetheless comparatively light and structural-space-saving as a drive. Via corresponding hydraulic valves, the hydraulic cylinder can also be controlled in a precise manner. However, other linear drives may also be considered for the adjustment of the coupling rod linkage.

According to one embodiment of the invention, the coupling rod linkage is in the form of a claw grid. A claw grid is a cost-effective and mechanically simple but reliable solution to transfer actuation movements from a drive motor to a plurality of lateral delimitations, wherein all the lateral delimitations move by the same extent in the adjustment direction.

According to one embodiment of the invention, the coupling rod linkage is in the form of a swing beam, which can be adjusted about an axis of rotation and which is connected via coupling rod linkages to the respective lateral delimitations. The swing beam is pivoted by a first lateral delimitation being displaced transversely relative to the extent direction of the receiving channels by a drive. Via a coupling rod linkage that connects this first lateral delimitation to the swing beam, the swing beam is also carried in the respective movement direction and, in this instance, pivoted about the rotation axis thereof. The pivot movement of the swing beam, via other coupling rod linkages which connect the swing beam to the other lateral delimitations, is in turn converted into a displacement movement of the remaining lateral delimitations, which then also move in the movement direction of the first lateral delimitation.

According to one embodiment of the invention, the coupling rod linkage is arranged in the region of the channel ends of the receiving channels. The coupling rod linkage may be arranged when viewed from the transfer zone on the channel ends, in particular directly behind the channel ends, wherein the coupling rod linkage may, in this instance, also be positioned in a height position above the receiving channels. With this positioning of the coupling rod linkage, the receiving space of the receiving channels between the lateral delimitations and above the lateral delimitations is not limited by the coupling rod linkage. Plant pots in which tall plants are planted can thus also be received by the apparatus.

According to one embodiment of the invention, there is used as a drive for adjusting the channel width of the receiving channels, a hydraulic cylinder, which is arranged transversely relative to the extent direction of the receiving channels in an at least substantially horizontal position behind the channel ends of the receiving channels in the apparatus. The arrangement behind the channel ends of the receiving channels, when viewed from the transfer zone is understood to be toward the channel ends, wherein the hydraulic cylinder, in this instance, can be positioned in a height position at the height of or above the receiving channels. In this installation position, there remains a sufficiently large travel path, which the hydraulic cylinder can retract and extend in order to adapt the channel width of the receiving channels to a desired channel width. The hydraulic cylinder is nonetheless installed in a position in the apparatus in which it is well protected against any impending potential collisions with obstacles during the maneuvering and transporting of plant pots with the apparatus. In this installation position, however, it does not impede the feeding and emptying of the receiving channels with plant pots, it is not subjected to any particular contamination risk, and the person operating the apparatus has in this installation position an unimpeded overview of the conveying of the plant pots.

According to one embodiment of the invention, the conveying apparatus is provided with motor-driven conveying means, which are constructed to at least partially revolve continuously on the respective lateral delimitations in the extent direction of the receiving channel and to be able to be operated selectively in the receiving direction or depositing direction. Continuously revolving conveying means, such as chains, belt conveyors, or band conveyors, can be produced in a cost-effective manner, can be operated in a low-maintenance manner, and are operationally reliable.

According to one embodiment of the invention, the conveying apparatus is driven with a rotatingly driven drive shaft, which is orientated parallel with the displacement member on which the lateral delimitations are supported, and the drive shaft has in the region of the receiving channels a circumferential tooth arrangement which meshes with internally toothed ring gears which can be displaced along the drive shaft together with the lateral delimitations which are associated therewith in each case, wherein the ring gears drive the conveying means which are arranged on the lateral delimitation which is associated therewith in each case. This drive concept makes it possible to displace the lateral delimitations in a transversely displaceable manner in an axial direction of the drive shaft, without thereby having to disengage the drive of the conveying means at the lateral delimitations when the channel width of the receiving member is intended to be adjusted. With a corresponding configuration of the apparatus, the lateral delimitations are transversely displaceable both along the drive shaft and along the displacement member. In this embodiment, the lateral delimitations are retained at two positions, whereby they are always retained in a desired spatial orientation regardless of the channel width adjustment thereof. The ring gears slide with an adjustment of the channel width along the circumferential tooth arrangement in an axial direction of the drive shaft without moving out of engagement with the circumferential tooth arrangement of the drive shaft.

According to one embodiment of the invention, the lateral delimitations are movably supported with a channel width of the receiving channels, which has been adjusted with the coupling rod linkage being maintained along the displacement member in a transversely displaceable manner with respect to the width of the frame. If the receiving channels are adjusted to a channel width, which is smaller than the maximum possible channel width, the frame of the apparatus is wider than the adjusted channel width of the receiving channels. As a result of the wider frame, however, it is then potentially no longer possible to still receive the outermost row of the plant pots with the apparatus since otherwise, the frame may collide with a side wall or a roof pillar or with rows of other plant pot rows which are placed beside the outermost plant pot row which is intended to be received and which laterally delimit the installation surface of the plant pots which are intended to be received. This applies accordingly when depositing plant pots. In order to nonetheless also be able to detect the outermost plant pot rows with the apparatus or to place them at the outermost edge of the provided installation surface, there is provision for the receiving channels to be able to be displaced on the whole in the transverse direction relative to the width of the frame so that the outermost receiving channel also with a channel width of the receiving channels which is adjusted to be narrower extends with the working width thereof up to the outer edge of the frame or even protrudes beyond it.

According to one embodiment of the invention, there is used as a drive for the transversely displaceable movement of the lateral delimitations a hydraulic cylinder which is arranged transversely relative to the extent direction of the receiving channels in an at least substantially horizontal position behind the channel ends of the receiving channels in the apparatus. The above statements relating to the channel width adjustment of the receiving channels with a hydraulic cylinder which is arranged horizontally behind the channel end apply accordingly to the advantages of this arrangement.

According to one embodiment of the invention, the conveying means are in the form of chains that revolve around the lateral delimitations on the upper and lower side, and the chains have at the side facing away from the respective lateral delimitation a support face which is intended to act as a support for plant pots while they are being received in the apparatus with the collar thereof. In order to receive plant pots with the apparatus, the lateral delimitations and, consequently, the receiving channels are adjusted to a spacing with respect to each other at which the plant pots which are intended to be received are positioned with a collar which is formed thereon on the support faces. If the chains are then moved along the receiving channel, the plant pots, which are positioned on the upper strand of the chains and which are consequently suspended therein, also move with the chains. The support faces may be formed by means of U-shaped metal sheets, which are placed over the associated chain links and permanently connected thereto. At the upper side, the support faces may have a friction-coefficient-enhancing or friction-coefficient-reducing coating so that the plant pots do not so easily slide when they are conveyed in or out or are transported with the apparatus or more readily slide on the support faces when the pots are intended to be orientated in a depositing direction by means of a stop.

According to one embodiment of the invention, lateral delimitations are provided at the lower side thereof with a skid. The skid may be present with a plurality or all of the lateral delimitations. As a result of the skid, the conveying means and/or the lateral delimitations are prevented from being able to collide with the ground. In plant nurseries, the ground is generally covered with root protection films or fleeces, which can become easily damaged if something becomes hooked therein. Via the skid, the conveying means and/or the respective lateral delimitation are maintained with a sufficient spacing with respect to the ground so that the components of the apparatus cannot come into contact with the ground, the root protection films, or fleeces. Furthermore, as a result of the skid, the risk of the conveying means being able to pick up dirt and foreign bodies from the ground, which could lead to increased wear and malfunctions is reduced.

According to one embodiment of the invention, the skid can be changed without the use of tools by means of a quick-change system. As a result of the simplified change of the skids, worn skids can be replaced easily and rapidly. Furthermore, different skids which have differing levels of suitability for different floor materials can be rapidly changed for each other.

According to one embodiment of the invention, the skid has a height adjustment device. As a result of the height adjustment device, the respective conveying apparatuses with their lateral delimitations can be better adapted to height dimensions of the respective plant pots, which are intended to be received or deposited. The height adjustment device may be able to be determined mechanically in a height position, for example, by means of a split pin or a bolt, the height adjustment device can be retained by means of an energy store in a height position, for example, by means of a mechanical spring which is pressed in by means of the height adjustment of the apparatus, or a motorized adjustment apparatus by means of which the skid can be adjusted into a desired height position and can be retained at that location is present.

According to one embodiment of the invention, the height adjustment device is coupled to the channel width adjustment by means of an actuator. Since plant pots having a relatively large diameter are generally also higher than plant pots with a relatively small diameter, via the actuator, it is possible to adjust the height adjustment device to a relatively large spacing with respect to the ground when the receiving channels are adjusted with the channel width adjustment to a relatively large channel width and, vice versa, to reduce the height dimension to which the height adjustment device is adjusted when the channel widths are adjusted to relatively small plant pots. The operation and handling are thereby simplified for the user. At most, small readjustments are still required if plant pots that are intended to be conveyed have a rather unusual height/width ratio in terms of their dimensions.

According to one embodiment of the invention, each receiving channel is delimited by a stop at the channel end. As a result of the stop, it is ensured that the receiving channels have extents of the same length. As a result of a stop, the rearmost plant pot, which is received in a receiving channel is also prevented from being pressed against the frame of the apparatus, wherein the plants which are located in the plant pots could become damaged. Instead, the stop stops the plant pot beforehand. The operation of the machine is thereby facilitated by the operator of the apparatus.

According to one embodiment of the invention, a stop of a receiving channel is arranged to be offset in the extent direction in adjacent receiving channels with respect to the stops. As a result of the arrangement of the stops in a manner displaced with respect to each other, the plant pots can be retained in a state offset with respect to each other in the respective receiving channels. When the plant pots are later deposited in a greenhouse, the offset arrangement of the plant pots with respect to each other in the receiving channels is important since the plant pots are then also discharged in a state offset from each other when subsequently conveyed out of the receiving channels. With an offset placement of the individual plant pots in adjacent rows, optimum use is made of the floor area of the greenhouse, and the plants each have sufficient space around them to be able to grow well.

According to one embodiment of the invention, the stop is coupled to the channel width adjustment by means of an actuator. The adaptation of the position of the stop in the longitudinal direction of the associated receiving channel to the adjusted receiving width of the receiving channel is advantageous for the same reasons as the adaptation of the height position of the height adjustment device. With plant pots having diameters of different sizes, there are also different positions of the stops, in which the apparatus receives an optimum great quantity of plant pots, in particular also in a mutually offset arrangement. If the ratio of the height and diameter dimensions of the plant pots with different pot sizes remains at an at least substantially equal ratio with respect to each other, no readjustments of the positions of the stops are required when the position of the stops with a width adjustment of the receiving channels is independently also adjusted via a corresponding actuator.

Other features of the invention will be appreciated from the claims, the figures, and the description of the figures. All features and feature combinations mentioned above in the description and the features and feature combinations mentioned below in the description of the figures and/or the features and feature combinations shown only in the figures can be used not only in the combination set out in each case, but also in other combinations or alone.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/ or (b) reasonable modifications not shown or described.

BRIEF DESCRIPTION OF THE DRAWINGS

The invention will now be explained in greater detail with reference to a preferred embodiment and with reference to the appended drawings.

Several embodiments in which the present invention can be practiced are illustrated and described in detail, wherein like reference characters represent like components throughout the several views. The drawings are presented for exemplary purposes and may not be to scale unless otherwise indicated.

In the drawings:

FIG. 1 shows a front view of the apparatus of the present invention;

FIG. 2 shows an enlarged view of a conveying means which revolves around a lateral delimitation;

FIG. 3 shows a detailed view of a channel end;

FIG. 4 shows a rear view of the apparatus of FIG. 1;

FIG. 5 shows the apparatus with tightly adjusted channel widths, wherein the lateral delimitations are displaced to the left on the frame;

FIG. 6 shows the apparatus with tightly adjusted channel widths, wherein the lateral delimitations are displaced to the right on the frame; and FIG. 7 shows the apparatus when plant pots are deposited or received.

An artisan of ordinary skill in the art need not view, within the isolated figure(s), the nearly infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

In FIG. 1, an apparatus 2 is shown obliquely from the front. The apparatus 2, which is shown as the embodiment has a total of eight receiving channels 4, which are retained on a frame 22 and which extend from a transfer zone 8, which is located in the front region of the apparatus 2, up to a channel end 10 in the extent direction R. Each receiving channel 4 has two lateral delimitations 6 which each determine the respective channel width 24 of a receiving channel 4.

In the transfer zone 8, the plant pots 26 are pulled into the receiving channels 4 or discharged again. The lateral delimitations 6 are provided at the lower side thereof with a skid 42 in each case. In order to receive the plant pots 2, the apparatus 2, which is installed in a carrier vehicle that is not illustrated, are driven into a standing stock of plant pots 26, wherein the plant pots 26 are, in this instance, received by the apparatus 2 and conveyed with a driven conveying apparatus 12 into the receiving channels 4 in a backward direction. The plant pots 26 can then be driven around with the apparatus 2 in order to bring the plant pots 26 to another installation location.

In order to be able to pull plant pots 26 into the apparatus 2 and to discharge them again, the apparatus 2 is provided with a conveying apparatus 12. The conveying apparatus 12 has conveying means 20, which are in the form in the embodiment of chains, which revolve around the lateral delimitations 6 at the upper and lower side. The chains have at the side facing away from the respective lateral delimitation 6 support faces 40, which are connected to the individual chain links and which are illustrated in FIG. 2 as an enlargement of the partial cut-out II in FIG. 1 and which are intended to act as a support for plant pots 26 when they are received in the apparatus 2 with the collar thereof. The conveying speed of the conveying apparatus 12 is preferably adapted to the travel speed at which the apparatus is moved when receiving and depositing the plant pots 26 in order to receive and deposit the most uniform rows possible.

Plant pots 26, which are used in a plant nursery, do not always have the same diameter. So that the receiving channels 4 can be adjusted to different channel widths 24, in order to be able to receive and convey plant pots 26 with different diameters, the lateral delimitations 6 are supported in a laterally displaceable and rotationally secure manner on a displacement member 16 which is orientated transversely relative to the extent direction R of the receiving channels 4. In the embodiment, the displacement member 16 comprises a pipe, which extends transversely over the width of the frame 22. Each lateral delimitation 6 is connected via a pipe socket 44 to the displacement member 16, which engages around the displacement member 16 in a play-free or almost play-free manner but in a displaceable manner in the extent directions of the displacement member 16.

The lateral delimitations 6 are connected to an adjustable coupling rod linkage 18 and retained thereby in the respective operating position thereof. The coupling rod linkage 18 forms a portion of the adjustment apparatus 14. The coupling rod linkage 18 is constructed when activated to adjust the channel width 24 of all the receiving channels 4 by the same value. To this end, the coupling rod linkage 18 in the embodiment can be adjusted by means of a linear drive. The coupling rod linkage 18 is arranged in the region of the channel ends 10 of the receiving channels 4. As shown in FIG. 3, the receiving channels 4 may be provided in each case at the channel ends 10 with a stop 46 against which the rearmost plant pot 26 located in a receiving channel 4 in each case is conveyed.

In the embodiment shown, the skids 42 are movably connected to the lateral delimitations 6 by means of pivotingly movable connection flaps. In FIG. 1, the second lateral delimitation 6 from the left is not shown in the illustration in order to enable a view of the actuator 48, which is located at the lower side of the lateral delimitation. When the actuator 48 is moved in the extent direction R, as indicated by the double-headed arrow, the height position of the associated skid 42 changes. The actuator 48 is drivingly connected to the coupling rod linkage 18 so that, when the channel width 24 is adjusted by means of the coupling rod linkage, the support height of the skid 42 is also changed. The pivotably movable connection flaps and the actuator 48, which is connected to the coupling rod linkage 18 together form a height adjustment device 52. The actuator 50 connects a stop 46 to a connection rod 30 of the coupling rod linkage 18 in each case so that the stops 46 are also adjusted when the coupling rod linkage 18 is adjusted.

There is used as a drive for adjusting the channel width 24 of the receiving channels 4 a first hydraulic cylinder 32 which is arranged transversely relative to the extent direction R of the receiving channels 4 in an at least substantially horizontal position behind the channel ends 10 of the receiving channels 4 in the apparatus 2, as can be seen in FIG. 4.

In the embodiment, the first hydraulic cylinder 32 is supported at a first end of frame 22. The opposing end of the first hydraulic cylinder 32 is connected to the rear end of a lateral delimitation 6. When the first hydraulic cylinder 32 is retracted and extended, it moves, in this instance the lateral delimitation 6, which is connected thereto along the displacement member 16. Since the lateral delimitation 6, which is connected to the first hydraulic cylinder 32, is connected to the coupling rod linkage 18, the displacement movement of the lateral delimitation 6, which is moved by the first hydraulic cylinder 32 via the coupling rod linkage 18 is transmitted to the remaining lateral delimitations 6 in accordance with the geometry of the swing beam 28 and the connection rods 30 which are connected thereto in a rotationally movable manner.

In the embodiment, for the transmission of the displacement movement of the lateral delimitation 6, which is moved by the first hydraulic cylinder 32 to the remaining lateral delimitations 6, there is provided a swing beam 28, which is connected via connection rods 30 to all the transversely displaceable lateral delimitations 6. When the lateral delimitation 6 moved by the first hydraulic cylinder 32 is displaced on the displacement member 16, this displacement movement is transmitted via the connection rod 30 from this lateral delimitation 6 initially to the swing beam 28, which is connected to this lateral delimitation 6 by means of a rotary joint. With the pivot movement of the swing beam 28, however, all the other connection rods 30, which are connected to the swing beam 28 by means of a rotary joint move and necessarily also the lateral delimitations 6, which are connected thereto in each case and which are themselves again connected by means of a rotary joint to the associated connection rod 30 in each case. In this manner, the driven movement of a single lateral delimitation 6 with the coupling rod linkage 18 is transmitted to all the remaining lateral delimitations 6. In place of the coupling rod linkage 18, which is shown in the embodiment and which has a swing beam 28 and connection rods 30, which are connected thereto in a pressure- and rotationally secure manner, a claw grid can also accordingly be used as the coupling rod linkage 18, wherein a lateral delimitation 6 is then associated with each intersection of the grid bars.

In order to move the plant pots 26 in the receiving channels 4, the conveying apparatus 12 is provided with motor-driven conveying means 20, which are constructed to revolve continuously at least partially on the respective lateral delimitations 6 in the extent direction R of the receiving channel 4 and, as indicated by the thick block arrow in FIG. 4, to be able to be operated selectively in the receiving direction or depositing direction. In the embodiment, the conveying apparatus 12 is driven with a rotatingly driven drive shaft 34, which is orientated parallel with the displacement member 16 on which the lateral delimitations 6 are supported. The drive shaft 34 has in the region of each lateral delimitation 6 a circumferential tooth arrangement or a toothed wheel which is connected to the drive shaft 34 in a rotationally secure manner and which meshes with an internally toothed ring gear 36, which together with the lateral delimitations 6 which are associated therewith can be displaced along the circumferential tooth arrangement of the drive shaft 34. The ring gears 36 drive the conveying means 20, which are arranged on the lateral delimitation 6, which is associated therewith in each case.

The lateral delimitations 6 are movably supported with a channel width 24 of the receiving channels 4, which is adjusted with the coupling rod linkage 18 being maintained along the displacement member 16 so as to be able to be transversely displaced relative to the width of the frame 22. There is used as a drive for the transversely displaceable movement of the lateral delimitations 6 a second hydraulic cylinder 38 which is arranged transversely relative to the extent direction R of the receiving channels 4 in an at least substantially horizontal position behind the channel ends 10 of the receiving channels 4 in the apparatus 2. When the second hydraulic cylinder 38 is retracted and extended, it moves the entire bundle of the lateral delimitations 6 with the coupling rod linkage 18 and the drive thereof along the displacement member 16 in the corresponding movement direction. FIG. 5 shows the bundle of the lateral delimitations 6 with a very tightly adjusted channel width 24, at which the sum of the receiving channels 4 is significantly narrower than the width of the frame 22. In order nonetheless also to be able to receive plant pots 26, which are located at the left edge in front of the apparatus 2 when viewed in the travel direction when the apparatus 2 is moved forward in an installation of plant pots 26, the bundle of lateral delimitations 6 has been displaced with the second hydraulic cylinder 38 eccentrically to the left edge of the frame 22. In FIG. 6, an adjustment of the apparatus is shown, in which the bundle of lateral delimitations 6 with a similarly tight adjustment of the channel width 24 has been displaced to the right edge of the frame 22. During the transverse displacement of the bundle of lateral delimitations 6 along the displacement member 16 by activating the second hydraulic cylinder 38, the adjustment of the channel width 24 of the receiving channels 4 remains unchanged as long as the first hydraulic cylinder 32 with which the coupling rod linkage 18 can be adjusted is not activated. The first hydraulic cylinder 32, together with the bundle of lateral delimitations 6, is moved by the second hydraulic cylinder 38 in the respective current adjustment along the displacement member 16.

FIG. 7 shows the apparatus 2 when the plant pots 26 are deposited on the ground. When the plant pots 26 are deposited, the apparatus 2 is moved in the direction F. In this instance, the conveying means 20 are driven in a direction counter to the direction F so that in each receiving channel 4, the foremost plant pot 26 in each case is deposited on the ground in the region of the transfer zone 8. When the movement speeds of the apparatus 2 in the direction F and the conveying means 20 counter to the direction F are identical, the plant pots 26 would be conveyed away from the receiving channels 4 with the spacings at which they are held in the receiving channels 4. If the movement speed of the apparatus 2 in the direction F is more rapid than the movement speed of the conveying means 20 counter to the direction F, the plant pots 26, which are placed on the ground, consequently, have mutual spacings which are greater than the spacings which the plant pots 26 had with respect to each other when they were held in the receiving channels 4, as shown in FIG. 7. By the stops 46 of a receiving channel 4 being arranged to be mutually offset with respect to the stops 46 in adjacent receiving channels 4 in the extent direction R, the plant pots 26 can also be placed on the ground in a manner offset in the longitudinal direction with respect to each other, which results in a uniform grid in which the plant pots 26 are placed on the ground and in which the plants which are located in the plant pots 26 have optimum spacings with respect to each other. When plant pots 26 are intended to be received in the receiving channels 4, the apparatus 2 is moved counter to the direction F toward the plant pots 26, which are located in the ground, and the conveying means 20 are driven in a continuously revolving manner in the direction F.

The invention is not limited to the above embodiments. The person skilled in the art has no difficulty in modifying the embodiments in a manner that appears appropriate to him/her in order to adapt them to a specific application.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 2 | Apparatus |
| 4 | Receiving channel |
| 6 | Lateral delimitation |
| 8 | Transfer zone |
| 10 | Channel end |
| 12 | Conveying apparatus |
| 14 | Adjustment apparatus |
| 16 | Displacement member |
| 18 | Coupling rod linkage |
| 20 | Conveying means |
| 22 | Frame |
| 24 | Channel width |
| 26 | Plant pot |
| 28 | Swing beam |
| 30 | Connection rod |
| 32 | First Hydraulic cylinder |
| 34 | Drive shaft |
| 36 | Ring gear |
| 38 | Second Hydraulic cylinder |
| 40 | Support face |
| 42 | Skid |
| 44 | Pipe sleeve |
| 46 | Stop |
| 48 | Actuator of skid |
| 50 | Actuator of stop |
| 52 | Height adjustment device |
| R | Extent direction of receiving channel |
| S | Extent direction of displacement member |
| F | Direction |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. An apparatus (2) for receiving and depositing plant pots (26) which stand in rows, the apparatus comprising:
   a frame (22);
   a plurality of receiving channels (4) which are arranged in parallel beside each other and which extend in an extent direction (R) and which are provided with lateral delimitations (6), wherein the receiving channels (4) in each case extend from a transfer zone (8) up to a channel end (10);
   a conveying apparatus (12) for moving the plant pots (26) in the extent direction (R) of the respective receiving channel (4); and
   an adjustment apparatus (14) for adjusting a channel width (24) of the receiving channels (4), wherein the lateral delimitations (6) are supported in a laterally displaceable and rotationally secure manner on a displacement member (16), which is orientated transversely relative to the extent direction (R) of the receiving channels (4), the lateral delimitations (6) are connected to an adjustable coupling rod linkage (18) and the lateral delimitations (6) are retained in respective operating position, the coupling rod linkage (18) forms the adjustment apparatus (14), and the coupling rod linkage (18) when activated adjusts the channel width (24) of all the receiving channels (4) by a same value simultaneously.

2. The apparatus (2) as claimed in claim 1, wherein the coupling rod linkage (18) is adjustable by means of a linear drive.

3. The apparatus (2) as claimed in claim 2, wherein the coupling rod linkage (18) is a claw grid.

4. The apparatus (2) as claimed in claim 1, wherein the coupling rod linkage (18) is a swing beam (28) which is adjustable about an axis of rotation and which is connected via connection rods (30) to the respective lateral delimitations (6).

5. The apparatus (2) as claimed in claim 1, wherein the coupling rod linkage (18) is arranged in a region of the channel ends (10) of the receiving channels (4).

6. The apparatus (2) as claimed in claim 1, further comprising a drive for adjusting the channel width (24) of the receiving channels (4) that includes a first hydraulic cylinder (32) which is arranged transversely relative to the extent direction (R) of the receiving channels (4) in an at least substantially horizontal position behind the channel ends (10) of the receiving channels (4) in the apparatus (2).

7. The apparatus (2) as claimed in claim 1, wherein the conveying apparatus (12) is provided with motor-driven conveying means (20), which are constructed to revolve continuously on the respective lateral delimitations (6) in the extent direction (R) of the receiving channel (4) and operates selectively in a receiving direction or depositing direction.

8. The apparatus (2) as claimed in claim 7, wherein the conveying apparatus (12) is driven with a rotatingly driven drive shaft (34), which is orientated parallel with the displacement member (16) on which the lateral delimitations (6) are supported, and the drive shaft (34) has in a region of each lateral delimitation (6) a circumferential tooth arrangement which meshes with an internally toothed ring gear (36) for displacing together with the lateral delimitations (6) which are associated therewith in each case along the circumferential tooth arrangement of the drive shaft (34), wherein the ring gears (36) drive the conveying means (20) which are arranged on the lateral delimitation (6) which is associated therewith in each case.

9. The apparatus (2) as claimed in claim 8, further comprising a drive for transversely displaceable movement of the lateral delimitations (6) that includes a second hydraulic cylinder (38) which is arranged transversely relative to the extent direction (R) of the receiving channels (4) in an at least substantially horizontal position behind the channel ends (10) of the receiving channels (4) in the apparatus (2).

10. The apparatus (2) as claimed in claim 1, wherein the lateral delimitations (6) are movably supported with a channel width (24) of the receiving channels (4), which has been adjusted with the coupling rod linkage (18) being maintained along the displacement member (16) in a transversely displaceable manner with respect to a width of the frame (22).

11. The apparatus (2) as claimed in claim 1, wherein the conveying means (20) includes chains that revolve around the lateral delimitations (6) on an upper and a lower side, and the chains have at a side facing away from the respective lateral delimitation (6) a support face (40) that provides a support for plant pots (26) while the plant pots (26) are being received in the apparatus (2) with a collar thereof.

12. The apparatus (2) as claimed in claim 1, wherein the lateral delimitations (6) are provided at a lower side thereof with a skid (42).

13. The apparatus (2) as claimed in claim 12, further comprising a quick change system that allows the skid (42) to be changed without the use of tools.

14. The apparatus (2) as claimed in claim 12, wherein the skid (42) has a height adjustment device (52).

15. The apparatus (2) as claimed in claim 14, wherein the height adjustment device (52) is coupled to the channel width adjustment by means of an actuator (46).

16. The apparatus (2) as claimed in claim 1, wherein each receiving channel (4) is delimited by a stop (46) at the channel end (10).

17. The apparatus (2) as claimed in claim 16, wherein a stop (46) of a receiving channel (4) is arranged to be offset in the extent direction (R) in adjacent receiving channels (4) with respect to the stops (46).

18. The apparatus (2) as claimed in claim 17, wherein the stop (46) is coupled to the channel width adjustment by means of an actuator (50).

* * * * *